US007590977B2

(12) United States Patent
Archambault et al.

(10) Patent No.: US 7,590,977 B2
(45) Date of Patent: Sep. 15, 2009

(54) METHOD AND SYSTEM FOR REDUCING MEMORY REFERENCE OVERHEAD ASSOCIATED WITH THREADPRIVATE VARIABLES IN PARALLEL PROGRAMS

(75) Inventors: Roch Georges Archambault, North York (CA); Shimin Cui, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 11/250,833

(22) Filed: Oct. 13, 2005

(65) Prior Publication Data

US 2007/0089105 A1  Apr. 19, 2007

(51) Int. Cl.
*G06F 9/45* (2006.01)
(52) U.S. Cl. .................................. 717/140; 717/157
(58) Field of Classification Search ................. 717/140, 717/149, 151, 157, 144
See application file for complete search history.

(56) References Cited

U.S. PATENT DOCUMENTS

| | | | |
|---|---|---|---|
| 5,345,588 A * | 9/1994 | Greenwood et al. .......... | 718/107 |
| 5,428,793 A * | 6/1995 | Odnert et al. ................ | 717/157 |
| 5,812,852 A * | 9/1998 | Poulsen et al. .............. | 717/149 |
| 5,812,858 A | 9/1998 | Nookala et al. | |
| 5,850,549 A | 12/1998 | Blainey et al. | |
| 6,427,195 B1 * | 7/2002 | McGowen et al. .......... | 711/153 |
| 6,505,344 B1 * | 1/2003 | Blais et al. ................... | 717/151 |
| 7,316,011 B1 * | 1/2008 | Rajaram et al. .............. | 717/157 |
| 7,376,941 B2 * | 5/2008 | Allen ........................... | 717/157 |
| 7,386,702 B2 * | 6/2008 | Schreter ....................... | 711/220 |
| 7,448,030 B2 * | 11/2008 | Liu et al. ..................... | 717/157 |
| 7,458,072 B2 * | 11/2008 | Moorthy et al. ............. | 717/157 |
| 2002/0019716 A1 * | 2/2002 | Agesen et al. ................ | 702/83 |
| 2002/0095453 A1 * | 7/2002 | Steensgaard ................ | 709/107 |
| 2002/0095668 A1 * | 7/2002 | Koseki et al. ................ | 717/157 |
| 2003/0056199 A1 * | 3/2003 | Li et al. ........................ | 717/127 |
| 2003/0066056 A1 | 4/2003 | Petersen et al. | |
| 2003/0236951 A1 * | 12/2003 | Choi et al. ................... | 711/150 |
| 2004/0193815 A1 * | 9/2004 | Haghighat et al. .......... | 711/158 |
| 2006/0005179 A1 * | 1/2006 | Kawahara et al. ........... | 717/157 |

OTHER PUBLICATIONS

Yankekevsky et al. "a-Coral: A Multigrain, Multithreading Processor Architecture", Jun. 2001, ACM, pp. 358-367.*
Krawezik et al. "Performance Comparison of MPI and three OpenMP Pargramming Styles on shared Memory Multiprocessors", Jun. 2003, ACM, pp. 118-127.*
U.S. Appl. No. 10/930,038, filed Aug. 30, 2004, Archambault et al.

* cited by examiner

*Primary Examiner*—Wei Y Zhen
*Assistant Examiner*—Anna Deng
(74) *Attorney, Agent, or Firm*—Yee & Associates, P.C.; Libby Z. Handelsman

(57) ABSTRACT

A computer implemented method, system and computer program product for accessing threadprivate memory for threadprivate variables in a parallel program during program compilation. A computer implemented method for accessing threadprivate variables in a parallel program during program compilation includes aggregating threadprivate variables in the program, replacing references of the threadprivate variables by indirect references, moving address load operations of the threadprivate variables, and replacing the address load operations of the threadprivate variables by calls to runtime routines to access the threadprivate memory. The invention enables a compiler to minimize the runtime routines call times to access the threadprivate variables, thus improving program performance.

8 Claims, 2 Drawing Sheets

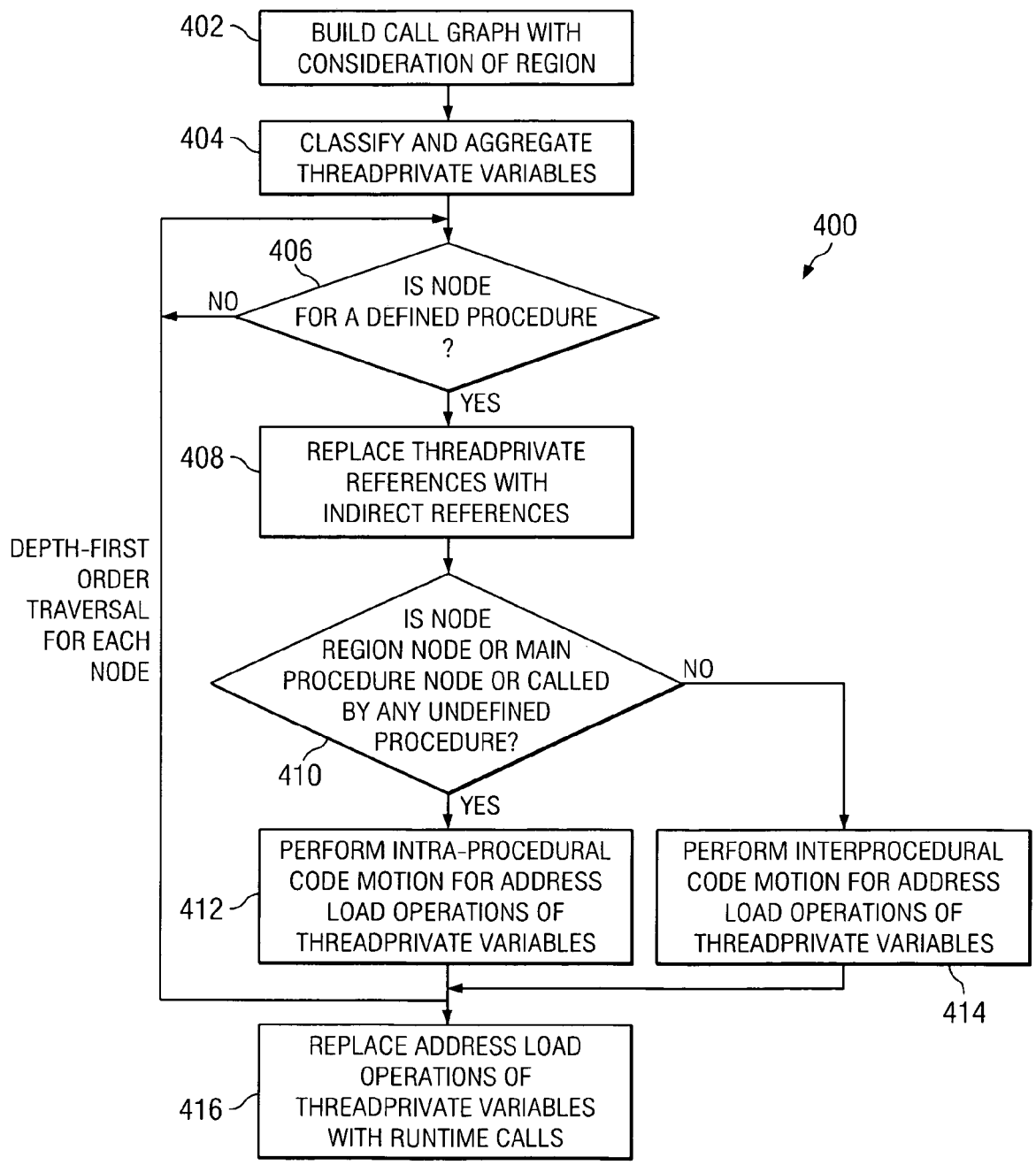

METHOD AND SYSTEM FOR REDUCING MEMORY REFERENCE OVERHEAD ASSOCIATED WITH THREADPRIVATE VARIABLES IN PARALLEL PROGRAMS

BACKGROUND OF THE INVENTION

1. Field of the Invention

The present invention relates generally to the data processing field, and more particularly, to a computer implemented method, system and computer program product for reducing threadprivate memory reference overhead in the presence of threadprivate variables in parallel programs during program compilation.

2. Description of the Related Art

OpenMP threadprivate variable is private to a thread but global within that thread. It has a separate threadprivate memory, i.e., thread-local storage, for each thread that uses it. The threadprivate memory is allocated during runtime. To access threadprivate data, a compiler needs to generate code to get the thread-local storage. The code to get the thread-local storage is to call runtime routine(s). This can be very time consuming, as it involves function calls, thread locking and memory traffic.

The IBM® XL compiler supports the threadprivate mechanism by which the compiler replaces references of threadprivate variables with function calls to the XL SMP (Symmetric Multiprocessing) runtime routines to get the address of the threadprivate memory. Linux compilers support the mechanism for thread-local variables specified with keyword _ thread with support from the linker, dynamic linker and system libraries by calling runtime routine _tls_get_addr( ) to get the memory address of thread-local variables. Since runtime routine calls are expensive, it is desirable to minimize runtime routine call times to get the threadprivate memory for threadprivate variables.

There is, accordingly, a need for a mechanism for reducing threadprivate memory reference overhead in the presence of threadprivate variables in parallel programs during program compilation.

SUMMARY OF THE INVENTION

The present invention provides a computer implemented method, system and computer program product for accessing threadprivate memory for threadprivate variables in a parallel program during program compilation. A computer implemented method for accessing threadprivate variables in a parallel program during program compilation includes aggregating threadprivate variables in the program, replacing references of the threadprivate variables by indirect references, moving address load operations of the threadprivate variables, and replacing the address load operations of the threadprivate variables by calls to runtime routines to access the threadprivate memory. The invention enables a compiler to minimize runtime routine call times to access the threadprivate variables, thus improving program performance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart that illustrates a compilation method for reducing threadprivate memory reference overhead in the presence of threadprivate variables according to an exemplary embodiment of the present invention.

DETAILED DESCRIPTION OF THE PREFERRED EMBODIMENT

Figure 1:
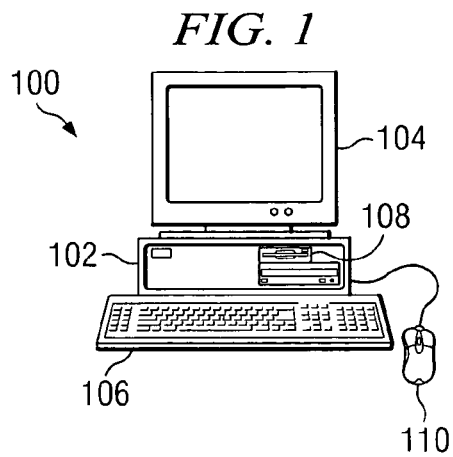
FIG. 1 is a pictorial representation of a data processing system in which the aspects of the present invention may be implemented.
Figure 2:
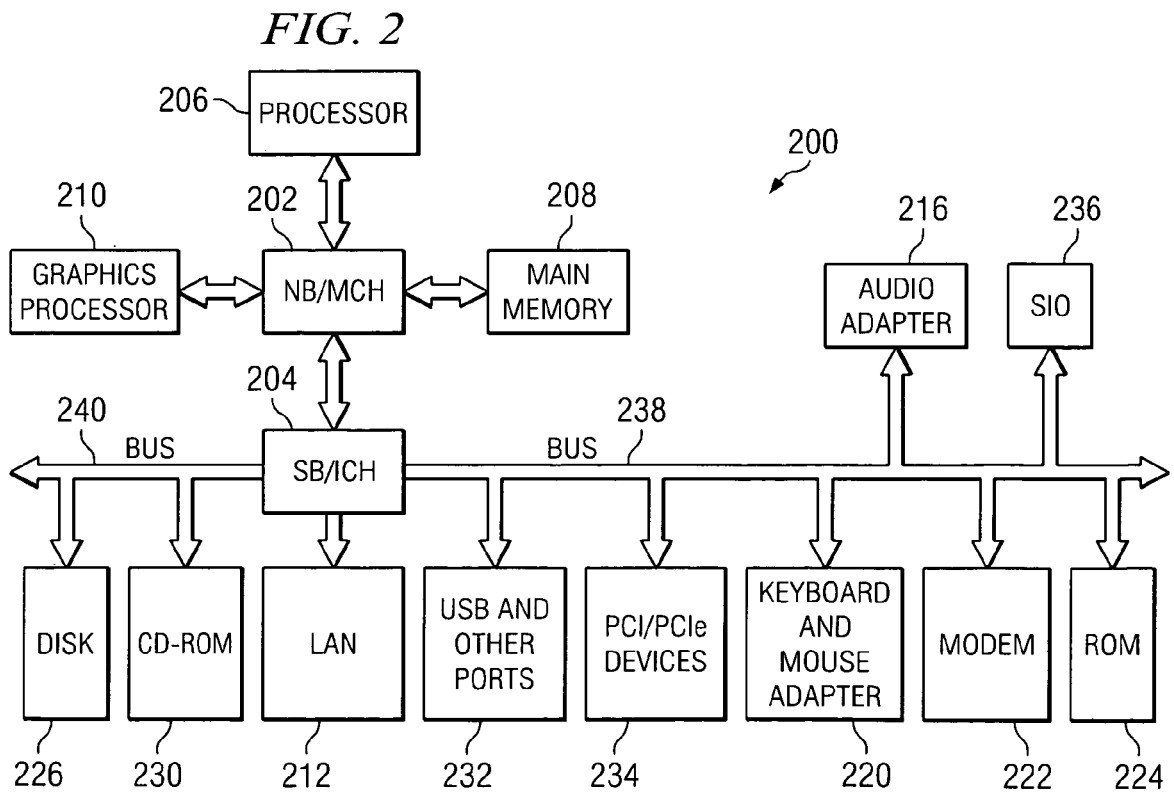
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, a pictorial representation of a data processing system in which the aspects of the present invention may be implemented is depicted. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method and framework for reducing threadprivate memory reference overhead in the presence of threadprivate variables in parallel programs during program compilation. Given an inter-procedural view of a computer program, an optimizing compiler according to an exemplary embodiment of the present invention builds a call graph for an entire program, and aggregates threadprivate variables in the program. References of the threadprivate variables are replaced by indirect references using their base addresses, and then the address load operations of the threadprivate variables are moved based on the call graph, data flow and control flow analyses. This allows the compiler to minimize runtime routine call times to get the threadprivate memory for threadprivate variables and thus improve program performance.

Figure 3:
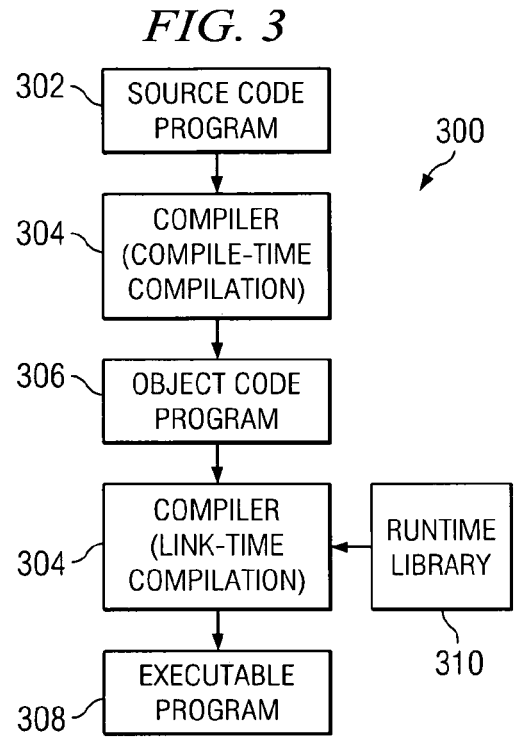
FIG. 3 is a block diagram that schematically illustrates a compiler system in which aspects of the present invention may be implemented.

FIG. 3 is a block diagram that schematically illustrates a compiler system in which aspects of the present invention may be implemented. The system is generally designated by reference number 300, and, as illustrated, a user, such as a programmer, may define a source code program 302 that is written in a high-level, human-readable language. Once source code program 302 is defined, compiler 304 is used to translate the source code program into an equivalent object code program that is in a machine language such that it can be executed by a computer. Compiler 304 can take multiple passes of the source program input in order to collect information that can be used for optimally restructuring the program. For example, inter-procedural analysis (IPA) is a two-pass (compile-phase pass and link-phase pass) compilation procedure used in the IBM XL compiler. The IPA compile-phase pass is performed at compile time and collects summary information that is written in the object file for each procedure compiled. The IPA link-phase pass is an information dissemination pass performed at link time when all files in the application have been compiled. More specifically, as shown in FIG. 3, at compile time, compiler 304 produces an intermediary form called object code, as illustrated at 306, which may be the same as or similar to a computer's machine language. At link time, the compiler and a linker produce an executable program 308, supported by runtime library 310, by transforming object code 306 into machine language if it is not already in this form. Compiler 304 may be implemented in a data processing system, such as data processing system 200 illustrated in FIG. 2.

FIG. 4 is a flowchart that illustrates a compilation method for reducing threadprivate memory reference overhead in the presence of threadprivate variables according to an exemplary embodiment of the present invention. The method is generally designated by reference number 400, and is effective in improving the execution performance of programs in the presence of threadprivate variables.

In general, a compilation method according to an exemplary embodiment of the present invention is implemented in a link-phase pass of an inter-procedural optimizing compiler, such as compiler 304 in FIG. 3, that generates an intermediate representation of the source code. A procedure is identified as a defined procedure if the intermediate representation for the procedure is available. Otherwise, the procedure is an undefined procedure. Runtime procedures are undefined procedures. The compilation method makes use of a control flow graph and a data flow graph, and use of such graphs in an optimizing compiler is well-known and well-understood in the compiler literature.

As shown in FIG. 4, the method begins by the system building a call graph (Step 402). The call graph is built for the whole program, and is a directed multi-graph in which nodes represent procedures in the code being compiled, and edges represent call points. The call graph is also built with consideration of region. A region is all code encountered during specific instances of the execution of a given construct such as an OpenMP executive directive and its associated statements. A node called region node is added for region code in the call graph. An edge is inserted from the owner of the region code to the region node. The edge is marked as a region call edge.

For example, in an XL compiler, this is realized by outlining the region code, and the region call edge is actually a combination of two call graph edges, one from the owner of the region code to the XL SMP runtime call node, and another from the XL SMP runtime call node to the node of the outlined region code. In this way, it can be ensured that no threadprivate storage code is moved out of the region code in the method of the present invention.

The threadprivate variables are then classified and aggregated (Step 404). Specifically, all the threadprivate variables are first classified into two categories. One category contains all those threadprivate variables that require static initializations, and the other category contains all other threadprivate variables, i.e., those that do not require static initializations. The system then aggregates threadprivate variables in the latter group in order to minimize runtime routine call times. This can also maximize data locality (variables are grouped in close proximity) and reduce register pressure (only one register is needed for a base address for grouped variables) when the threadprivate variables are used in loops. U.S. Pat. No. 5,850,549 describes one method for aggregating global data variables in external storage, and the method described therein can be used for aggregating threadprivate variables according to an exemplary embodiment of the present invention.

Each node in the depth-first order in the call graph is then traversed. For each call graph node reached in the traversal, a determination is made whether the node is for a defined procedure (Step 406). If the node is for a defined procedure (Yes output of Step 406), the threadprivate references are first all replaced by indirect references using base addresses of the threadprivate variables (Step 408). The references include load and store operations. If the threadprivate variable is aggregated, the base address of the threadprivate aggregate is used. For example, a load operation of a scalar threadprivate variable "tpv" will be replaced by a dereference of address of "tpv" in the form of "*(&tpv)". If the scalar threadprivate is aggregated, the replaced form will be "*(&tpv_aggr+offset_tpv)", where "tpv_aggr" is the threadprivate aggregate that contains the threadprivate variable "tpv", and "offset_tpv" is the offset of "tpv" in the aggregate of "tpv_aggr". If the node is not for a defined procedure (No output of Step 406), the process returns to Step 406 for the next call graph node.

A determination is then made whether the node is a region node or is the main procedure node or is called by any undefined procedure (Step 410). If the node is for a defined procedure and is a region node or for the main procedure or is called by an undefined procedure (Yes output of Step 410), movement of the address load operations of the threadprivate variables is performed within the procedure based on data flow analysis and control flow analysis, for example, &tpv or &tpv_aggr, such that there is only one address load operation for each threadprivate variable in each control flow path (Step 412). The method for doing this, according to an exemplary embodiment of the present invention, is an adaptation of a code motion algorithm described in the publication "Advanced Compiler Design and Implementation", S. Muchnuk, Morgan-Kaufmann, 1997.

If the node is for a defined procedure but is not a region node and not the main procedure node and is not called by any undefined procedure (No output of Step 410), movement of the address load operations of the threadprivate variables is performed outside of the procedure according to the present invention (Step 414). This movement can be accomplished, for example, using inter-procedural code motion by adding a new parameter or by using a register to pass the value of the address (See commonly assigned, copending U.S. patent application entitled METHOD AND APPARATUS FOR OPTIMIZING SOFTWARE PROGRAM USING INTER-PROCEDURAL STRENGTH REDUCTION, Ser. No. 10/930,038, filed on Aug. 30, 2004, the disclosure of which is hereby incorporated by reference).

As shown in FIG. 4, steps 406-414 are repeated for each call graph node reached in the traversal; and the address load operations of the threadprivate variables are then replaced by runtime routine calls to obtain the threadprivate memory addresses (Step 416). Unique structured data may be generated for each threadprivate variable to pass to runtime routines for data storage allocation and access. Each unique structured data will contain information regarding the threadprivate variable and the static initialization.

The present invention thus provides a computer implemented method, system and computer program product for reducing threadprivate memory reference overhead in the presence of threadprivate variables in parallel programs during program compilation. A computer implemented method for accessing threadprivate variables in a parallel program during program compilation includes aggregating threadprivate variables in the program, replacing references of the threadprivate variables by indirect references, moving address load operations of the threadprivate variables, and replacing the address load operations of the threadprivate variables by calls to runtime routines to access the threadprivate memory. The invention enables a compiler to minimize the runtime routines call times to access the threadprivate variables, thus improving program performance. Although not described herein, other intra-procedural or inter-procedural optimizations may also be performed among the steps described above to further improve the execution performance of parallel programs in the presence of threadprivate variables without departing from the scope of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from (or comprising) a computer-usable or computer-readable medium providing computer-usable or computer-readable program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for accessing threadprivate memory for a first set of threadprivate variables in a parallel program during program compilation, the method comprising:
    building a call graph for a program, using a processor, wherein a node is created in the call graph for each procedure in the program and a region node is created for each region in the program;
    classifying a first set of threadprivate variables in the program into a second set of threadprivate variables and a third set of threadprivate variables, wherein the second set of threadprivate variables require a static initialization and the third set of threadprivate variables do not require the static initialization;
    performing a traversal of the call graph;
    responsive to traversing a node that represents a defined procedure, replacing references to a fourth set of threadprivate variables in the defined procedure with a set of indirect references using a set of base addresses of the fourth set of threadprivate variables;
    responsive to the node being a region node, a main procedure node or the node representing a procedure called by an undefined procedure, moving address load operations of the threadprivate variables within the procedure such that there is only one address load operation for each threadprivate variable in each control flow path;
    responsive to the node not being the region node, not being the main procedure node, and not being the node representing the procedure called by the undefined procedure, moving the address load operations of the threadprivate variables outside of the procedure using an inter-procedural code motion;
    replacing, in a memory, the address load operations of the threadprivate variables with calls to runtime routines to access the threadprivate memory; and
    generating a unique structured data for each threadprivate variable from the first set of threadprivate variables to pass to the runtime routine calls to obtain threadprivate memory addresses, wherein each of the unique structured data includes an address of a static copy of an associated threadprivate variable and a static initialization for the associated threadprivate variable.

2. The method of claim 1, further comprising aggregating the third set of threadprivate variables prior to initiating the depth-first order traversal of the call graph.

3. The method of claim 1, wherein the traversal of the call graph is a depth-first order traversal.

4. The method of claim 1, wherein the method is performed by a processor executing a link-phase pass of an inter-procedural optimizing compiler.

5. The method of claim 1, wherein the region is a set of program code encountered during the execution of a construct.

6. The method of claim 5, wherein the construct is an OpenMP executive directive and a set of associated statements.

7. A computer program product comprising:
    a computer readable storage medium having computer readable program code configured for accessing threadprivate memory for a first set of threadprivate variables in a parallel program during program compilation, the computer program product further comprising:
    computer readable program code configured for building a call graph for a program, using a processor, wherein a node is created in the call graph for each procedure in the program and a region node is created for each region in the program;
    computer readable program code configured for classifying a first set of threadprivate variables in the program into a second set of threadprivate variables and a third set of threadprivate variables, wherein the second set of threadprivate variables require a static initialization and the third set of threadprivate variables do not require the static initialization;
    computer readable program code configured for performing a traversal of the call graph;
    computer readable program code configured for replacing references to a fourth set of threadprivate variables in the defined procedure with a set of indirect references using a set of base addresses of the fourth set of threadprivate variables responsive to traversing a node that represents a defined procedure;
    computer readable program code configured for moving address load operations of the threadprivate variables within the procedure such that there is only one address load operation for each threadprivate variable in each control flow path responsive to the node being a region node, a main procedure node or the node representing a procedure called by an undefined procedure;
    computer readable program code configured for moving the address load operations of the threadprivate variables outside of the procedure using an inter-procedural code motion responsive to the node not being the region node, not being the main procedure node, and not being the node representing the procedure called by the undefined procedure;
    computer readable program code configured for replacing, in a memory, the address load operations of the threadprivate variables with calls to runtime routines to access the threadprivate memory; and
    computer readable program code configured for generating a unique structured data for each threadprivate variable from the first set of threadprivate variables to pass to the runtime routine calls to obtain threadprivate memory addresses, wherein each of the unique structured data includes an address of a static copy of an associated threadprivate variable and a static initialization for the associated threadprivate variable.

8. A data processing system, including a compiler, stored on a computer readable storage medium, for accessing threadprivate memory for a first set of threadprivate variables in a parallel program during program compilation, the data processing system comprising:

the compiler stored on a computer readable storage medium, the compiler comprising:

a mechanism for using a processor to build a call graph for a program, using a processor, wherein a node is created in the call graph for each procedure in the program and a region node is created for each region in the program;

a mechanism for using the processor to classify a first set of threadprivate variables in the program into a second set of threadprivate variables and a third set of threadprivate variables, wherein the second set of threadprivate variables require a static initialization and the third set of threadprivate variables do not require the static initialization;

a mechanism for using the processor to perform a traversal of the call graph;

a mechanism for using the processor to replace references to a fourth set of threadprivate variables in the defined procedure with a set of indirect references using a set of base addresses of the fourth set of threadprivate variables responsive to traversing a node that represents a defined procedure;

a mechanism for using the processor to move address load operations of the threadprivate variables within the procedure such that there is only one address load operation for each threadprivate variable in each control flow path responsive to the node being a region node, a main procedure node or the node representing a procedure called by an undefined procedure;

a mechanism for using the processor to move the address load operations of the threadprivate variables outside of the procedure using an inter-procedural code motion responsive to the node not being the region node, not being the main procedure node, and not being the node representing the procedure called by the undefined procedure;

a mechanism for using the processor to replace, in a memory, the address load operations of the threadprivate variables with calls to runtime routines to access the threadprivate memory; and a mechanism for using the processor to generate a unique structured data for each threadprivate variable from the first set of threadprivate variables to pass to the runtime routine calls to obtain threadprivate memory addresses, wherein each of the unique structured data includes an address of a static copy of an associated threadprivate variable and a static initialization for the associated threadprivate variable.

* * * * *